US009639461B2

(12) United States Patent
Eitan et al.

(10) Patent No.: US 9,639,461 B2
(45) Date of Patent: May 2, 2017

(54) SYSTEM AND METHOD OF PROCESSING OF DUPLICATE DATA AT A DATA STORAGE DEVICE

(71) Applicant: SANDISK TECHNOLOGIES INC., Plano, TX (US)

(72) Inventors: Yarden Eitan, Kfar Saba (IL); Udi Agami, Rishon Lezion (IL); Eran Sharon, Rishon Lezion (IL); Idan Alrod, Herzliya (IL)

(73) Assignee: SANDISK TECHNOLOGIES LLC, Plano, TX (US)

( * ) Notice: Subject to any disclaimer, the term of this patent is extended or adjusted under 35 U.S.C. 154(b) by 34 days.

(21) Appl. No.: 13/839,128

(22) Filed: Mar. 15, 2013

(65) Prior Publication Data

US 2014/0281134 A1    Sep. 18, 2014

(51) Int. Cl.
*G06F 12/00* (2006.01)
*G06F 12/02* (2006.01)

(52) U.S. Cl.
CPC .............................. *G06F 12/0246* (2013.01)

(58) Field of Classification Search
CPC ................................................ G06F 12/0246
USPC ................................................ 711/202, 103
See application file for complete search history.

(56) References Cited

U.S. PATENT DOCUMENTS

| | | | |
|---|---|---|---|
| 5,603,001 A * | 2/1997 | Sukegawa et al. | 711/103 |
| 5,732,265 A * | 3/1998 | Dewitt et al. | |
| 5,737,742 A * | 4/1998 | Achiwa et al. | 711/103 |
| 6,374,266 B1 * | 4/2002 | Shnelvar | |
| 8,156,279 B2 | 4/2012 | Tanaka et al. | |
| 2008/0005141 A1 | 1/2008 | Zheng et al. | |
| 2008/0281908 A1 * | 11/2008 | McCanne et al. | 709/203 |
| 2009/0089518 A1 | 4/2009 | Hobbet et al. | |
| 2009/0265506 A1 * | 10/2009 | Yim | 711/103 |
| 2011/0107052 A1 * | 5/2011 | Narayanasamy | G06F 3/0608 711/171 |
| 2011/0119429 A1 | 5/2011 | Tu et al. | |
| 2011/0179341 A1 * | 7/2011 | Falls et al. | 714/807 |
| 2011/0219168 A1 | 9/2011 | Stephens | |

FOREIGN PATENT DOCUMENTS

WO    2009117251 A1    9/2009

OTHER PUBLICATIONS

Lim, Seung-Ho. "DeFFS: Duplication-Eliminated Flash File System," Computers & Electrical Engineering, vol. 37, Issue 6, Nov. 2011, pp. 1122-1136.
"Data Deduplication", Wikipedia, the free encyclopedia, http://en.wikipedia.org/wiki/Data_deduplication, printed Feb. 17, 2015, 4 pages.
"Write Amplification", Wikipedia, the free encyclopedia, https://web.archive.org/web/20120727215018/https://en.wikipedia.org/wiki/Garbage_collection_(SSD)#cite_note-Anand_WA-4, printed Feb. 17, 2015, 11 pages.

* cited by examiner

*Primary Examiner* — Larry MacKall
(74) *Attorney, Agent, or Firm* — Toler Law Group, PC

(57) ABSTRACT

A data storage device includes a memory and a controller. A method may be performed at the data storage device. The method includes receiving a request to write data, generating a signature of the data, and searching a signature table to determine if the generated signature is in the signature table. The signature table includes at least one signature table entry that includes a signature of stored data and a physical address of the stored data.

24 Claims, 2 Drawing Sheets

SYSTEM AND METHOD OF PROCESSING OF DUPLICATE DATA AT A DATA STORAGE DEVICE

FIELD OF THE DISCLOSURE

The present disclosure is generally related to processing of duplicate data at a data storage device.

BACKGROUND

Non-volatile data storage devices, such as universal serial bus (USB) flash memory devices or removable storage cards, have allowed for increased portability of data and software applications. Flash memory devices can enhance data storage density by storing multiple bits in each flash memory cell. For example, Multi-Level Cell (MLC) flash memory devices provide increased storage density by storing 3 bits per cell, 4 bits per cell, or more. When duplicate data is stored in the flash memory, resources of the flash memory are wasted and performance of the flash memory is affected.

SUMMARY

To reduce storage of duplicate data items in a memory, a controller of a data storage device generates and maintains a signature table and a logical mapping table. Entries in the logical mapping table may be mapped to an entry in the signature table. The entry in the signature table includes a signature (e.g. a cyclic redundancy check (CRC)) of a data item stored in the memory and a physical address of the data item. When a duplicate data item is detected (by detecting a signature match), the logical mapping table and the signature table are updated rather than writing the duplicate data item in the memory.

In a particular embodiment, a method, performed in a data storage device including a controller and a flash memory while the data storage device is operatively coupled to a host device, includes receiving a request to write data from the host device. The method generates a signature of the data and searches a signature table in a memory of the controller to determine if the generated signature is in the signature table. The signature table includes a signature table entry corresponding to stored data. The signature table entry includes a signature of the stored data and a physical address of the stored data.

In another embodiment, a data storage device includes a controller that includes a signature table and a non-volatile memory coupled to the controller. The signature table includes at least one signature table entry that contains a signature field and a physical address field. The signature field is configured to store a signature that corresponds to a data element stored in the non-volatile memory and the physical address field is configured to store a physical address of the data element.

DETAILED DESCRIPTION

Figure 1:
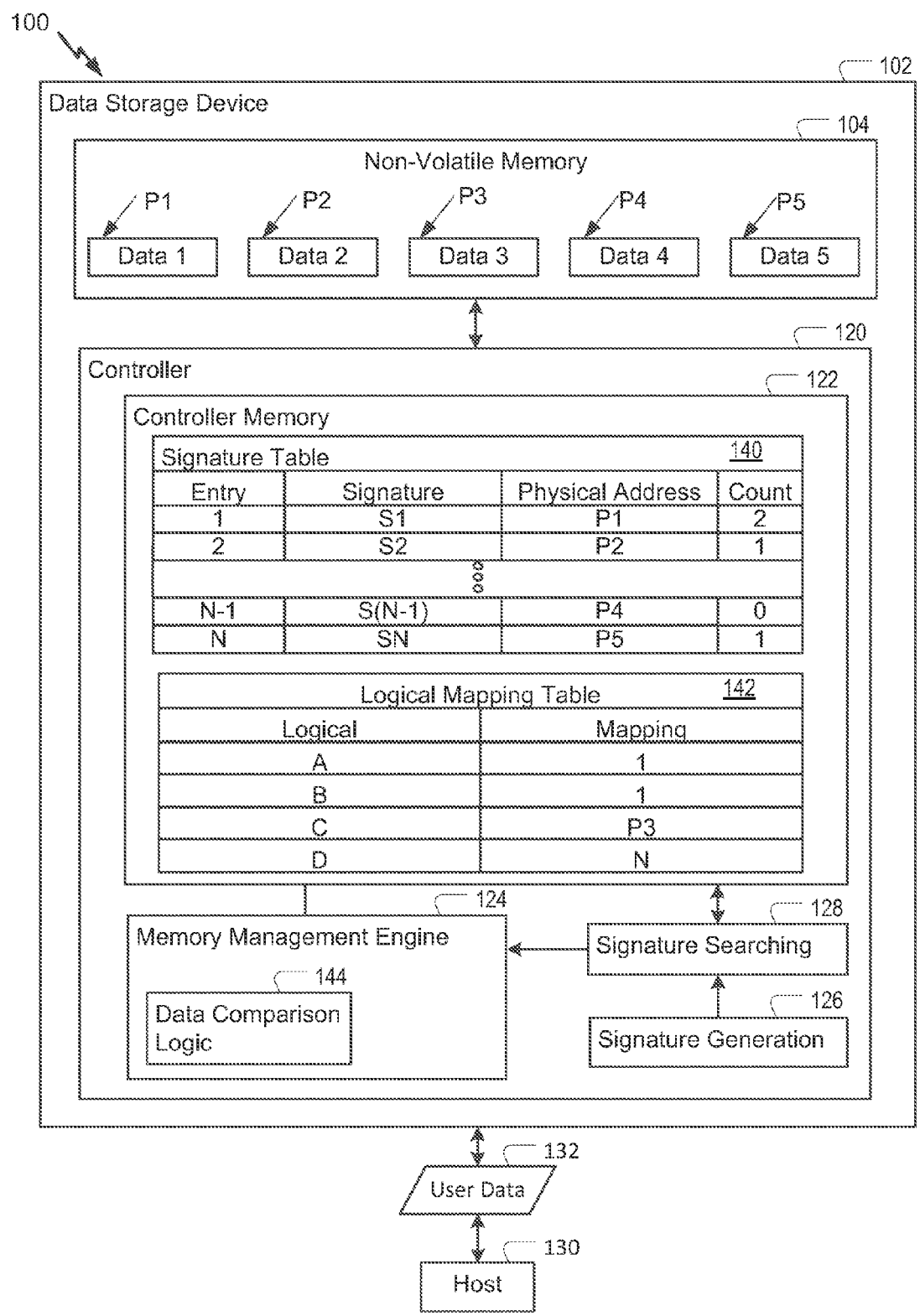
FIG. 1 is a block diagram of a particular illustrative embodiment of a system including a data storage device that includes a controller that generates or uses a signature table to avoid duplicate data storage.

Referring to FIG. 1, a particular embodiment of a system 100 includes a data storage device 102 coupled to a host device 130. The data storage device 102 includes a controller 120 that is configured to process duplicate data, and the data storage device 102 includes a memory 104.

The host device 130 may be configured to provide data, such as user data 132, to be stored at the non-volatile memory 104 or to request data to be read from the non-volatile memory 104. For example, the host device 130 may send a command, such as a write command, to store the user data 132 within the data storage device 102. For example, the host device 130 may send a write command and the user data 132 to the data storage device 102 for storage in the non-volatile memory 104. The host device 130 may include a mobile telephone, a music player, a video player, a gaming console, an electronic book reader, a personal digital assistant (PDA), a computer, such as a laptop computer, a notebook computer, or a tablet, any other electronic device, or any combination thereof. The host device 130 communicates via a memory interface that enables reading from the non-volatile memory 104 and writing to the non-volatile memory 104. For example, the host device 130 may operate in compliance with a Joint Electron Devices Engineering Council (JEDEC) industry specification, such as a Universal Flash Storage (UFS) Host Controller Interface specification. As other examples, the host device 130 may operate in compliance with one or more other specifications, such as a Secure Digital (SD) Host Controller specification as an illustrative example. The host device 130 may communicate with the memory 104 in accordance with any other suitable communication protocol.

The non-volatile memory 104 may be a flash memory, such as a NAND flash memory. The non-volatile memory 104 includes a representative group of storage elements, such as a word line of a multi-level cell (MLC) flash memory. The non-volatile memory 104 includes a plurality of data items, such as the illustrated data items 1-5. Each of the plurality of data items has a corresponding memory address. For example, each of the data items 1-5 has a corresponding physical address (indicated as pointers P1-P5).

The data storage device 102 may be a memory card, such as a Secure Digital SD® card, a MicroSD® card, a MiniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). As another example, the data storage device 102 may be configured to be coupled to the host device 130 as embedded memory, such as eMMC® (trademark of JEDEC Solid State Technology Association, Arlington, Va.) and eSD, as illustrative examples. To illustrate, the data storage device 102 may correspond to an eMMC (embedded MultiMedia Card) device. The data storage device 102 may operate in compliance with a JEDEC industry specification. For example, the data storage device 102 may operate in compliance with a JEDEC eMMC specification, a JEDEC Universal Flash Storage (UFS) specification, one or more other specifications, or a combination thereof.

The controller 120 is configured to receive data and instructions from and to send data to the host device 130 while the data storage device 102 is operatively coupled to the host device 130. The controller 120 is further configured to send data and commands to the non-volatile memory 104 and to receive data from the non-volatile memory 104. For example, the controller 120 is configured to send data and a write command to instruct the non-volatile memory 104 to store the data to a specified address. As another example, the controller 120 is configured to send a read command to read data from a specified address of the non-volatile memory 104.

The controller 120 includes a controller memory 122, a memory management engine 124, a signature generation module 126, and a signature searching module 128. The controller memory 122 may be a random access memory (RAM), as an example. The memory management engine 124 includes data comparison logic 144.

The controller memory 122 includes a signature table 140 and a logical mapping table 142. The signature table 140 includes a plurality of entries, such as the illustrated entries 1, 2, . . . , N. Each of the plurality of entries in the signature table 140 includes a plurality of fields including a signature field, a physical address field, and a count field. The signature field corresponds to a signature of data stored within the non-volatile memory 104. Each signature field within an entry of the signature table 140 is configured to store a data signature that corresponds to a data item stored in the non-volatile memory 104. For example, the signature may be a cyclic redundancy check (CRC) of a data item stored within the non-volatile memory 104. The physical address field includes a physical address of data stored within the non-volatile memory 104. The count field identifies a number (i.e., a count) of logical addresses within the logical mapping table 142 that are linked to, or otherwise correspond to, the particular entry within the signature table 140.

In a particular embodiment, the signature table 140 may be implemented as a data pointer table. The signature within the signature table 140 may represent a particular chunk of data within the non-volatile memory 104 and may be used to determine, with a high degree of certainty, whether particular data chunks are identical. The count within a particular entry in the signature table 140 provides an indication of how many logical addresses for a data item stored within the non-volatile memory 104 have been received from the host device 130 and mapped by the logical address table 142 to that particular entry within the signature table 140. For example, the count may indicate the number of elements within the logical mapping table 142 that link to the particular entry within the signature table 140.

The logical mapping table 142 includes logical addresses and mapping information. The mapping information may correspond to a physical address of a data item stored within the non-volatile memory 104, or the mapping information may correspond to a particular entry of the signature table 140. For example, referring to the logical mapping table 142, the logical address "A" has a corresponding mapping entry of "1" indicating a mapping to the first entry within the signature table 140. Similarly, the logical address "B" maps to entry "1" of the signature table 140. The logical address "C" maps to a physical address of "P3" that corresponds to the third data item stored within the non-volatile memory 104. The logical address "D" maps to entry "N" of the signature table 140. Thus, the mapping field within each entry in the logical mapping table 142 is linkable to an entry in the signature table 140 or to a physical address.

During operation, while the data storage device 102 is operatively coupled to the host device 130, the user data 132, along with a write command, may be sent by the host device 130 to the data storage device 102. In response to receiving the user data 132 and the data write command, the user data 132 may be provided to the signature generation module 126 to generate a signature of the user data 132. For example, the signature generation module 126 may perform a cyclic redundancy check (CRC) operation to generate a CRC value that corresponds to the user data 132.

The signature generated by the signature generation module 126 is provided to the signature searching module 128. The signature searching module 128 may compare the signature generated by the signature generation module 126 to each signature item within the signature table 140. For example, the signature searching module 128 may compare a generated CRC value against each of the CRCs (i.e., S1, S2, . . . SN) stored within the signature table 140. If the signature generated by the signature generation module 126 matches a signature stored within the signature table 140, then a potential match between the user data 132 and a data item stored within the non-volatile memory 104 is detected.

To determine whether the potential match is an actual match, the data item corresponding to the entry within the signature table 140 may be retrieved from the non-volatile memory 104 and the data comparison logic 144 within the memory management engine 124 may compare the retrieved data item from the non-volatile memory 104 to the user data 132. Upon detecting a match, the memory management engine 124 may update an entry within the logic mapping table 142. For example, if the signature of the user data 132 matches the signature "S2" of the second entry of the signature table 140, and if the data comparison logic 144 confirms a data match, rather than storing the user data 132 at an unused portion of the non-volatile memory 104, the memory management engine 124 of the controller 120 updates mapping information within the logical mapping table 142. For example, if the logical address corresponds to the logical address "B", the mapping information corresponding to logical address "B" would be updated from the value of "1" to a value of "2" since the second entry (entry "2") within the signature table 140 has the matching signature "S2". In addition, once the logical mapping table 142 has been updated, the count field within the signature table 140 is also updated (e.g., the count within the second entry at the signature table 140 is incremented by one).

Thus, instead of storing duplicate data within the non-volatile memory 104, the controller 120 may update the logical mapping table 142 in the controller memory 122. Updating the logical mapping table 142 in the controller memory 122 consumes less resources and may be performed faster than storing the user data 132 in the non-volatile memory 104. In addition, use of the signature table 140 to identify duplicate data items (as compared to storing and reading duplicate data items in the memory) conserves resources of the data storage device 102.

Accordingly, the data storage device 102 avoids duplication (or reduces instances of data duplication) of data and conserves memory resources. As a result, data patterns that appear frequently may be stored by common data storage elements within the non-volatile memory 104 by use of the signature table 140 and the logical mapping table 142. As a result of avoiding (or reducing) duplicate data storage, the endurance of the data storage device 102 is increased (e.g., by avoiding unnecessary write and erase cycles).

The controller 120 may be configured to identify logical address as being a frequently written ("hot") logical address. For example, the controller 120 may maintain a list of logical addresses that are more frequently written to in write requests from the host device 130 than other logical addresses. Although such "hot" logical addresses may be frequently written to, often only a small number of different data values are repeatedly written to the logical address. For example, a hot logical address may be used by an application at the host device 130 to store updates to a state variable that may toggle between a "1" value or a "0" value.

The signature table 140 may store multiple entries for a hot logical address, although one or more of the entries may be unused. For example, rather than repeatedly writing "0" values and "1" values of the state variable to the non-volatile memory 104, the controller 120 may maintain both "0" and "1" values as stored data in the non-volatile memory 104 and may maintain an entry in the signature table 140 for each of the stored values. As a result, when a write request is received to update the value stored to the hot logical address, the controller 120 may update the entry in the logical mapping table 142 to map to the appropriate entry in the signature table 140.

As an example, data item 4 and data item 5 in the non-volatile memory 104 may correspond to different values that have been mapped to a particular hot logical address. Entry (N-1) of the signature table 140 maps to data item 4 and entry N of the signature table 140 maps to data item 5. Logical address D in the logical mapping table 142 is a hot logical address that maps to entry N in the signature table 140 (i.e., to data item 5). Prior to mapping to entry N, logical address D mapped to entry (N-1) in the signature table 140 (i.e., to data item 4). Data item 4 and entry (N-1) are not associated with any logical address but are maintained by the controller 120 as being associated with a hot logical address.

In response to receiving a request from the host device 130 to write data matching data item 4 to logical address D, the controller 120 may determine that entry N-1 corresponds to the write data (e.g., by generating and comparing signatures, and reading and comparing data item 4 to the write data). The controller 120 may write mapping information to the entry for logical address D in the logical mapping table 142 to cause the entry for logical address D to point to entry N-1 in the signature table entry 140. The controller 120 may increment the count value for entry N-1 in the signature table 140 (e.g., from "0" to "1") and may decrement the count value in the signature table entry for entry N (e.g., from "1" to "0"). Because the entry for logical address D in the logical mapping table 142 is identified as a frequently modified entry, entry N is maintained in the signature table 140 and data item 5 is maintained in the non-volatile memory 104 independent of the count value.

In this manner, the controller 120 may maintain a history of two or more data values associated with a hot logical address that is frequently modified (or multiple values for each of multiple hot logical addresses). When an updated data value for a hot logical address matches an already stored data value, the hot logical address may be mapped to the signature table entry corresponding to the stored data value. As a result, increased wear due to erasing the data value from the non-volatile memory 104 may be avoided, and latency associated with writing the updated data value to the non-volatile memory 104 may also be avoided.

Figure 2:
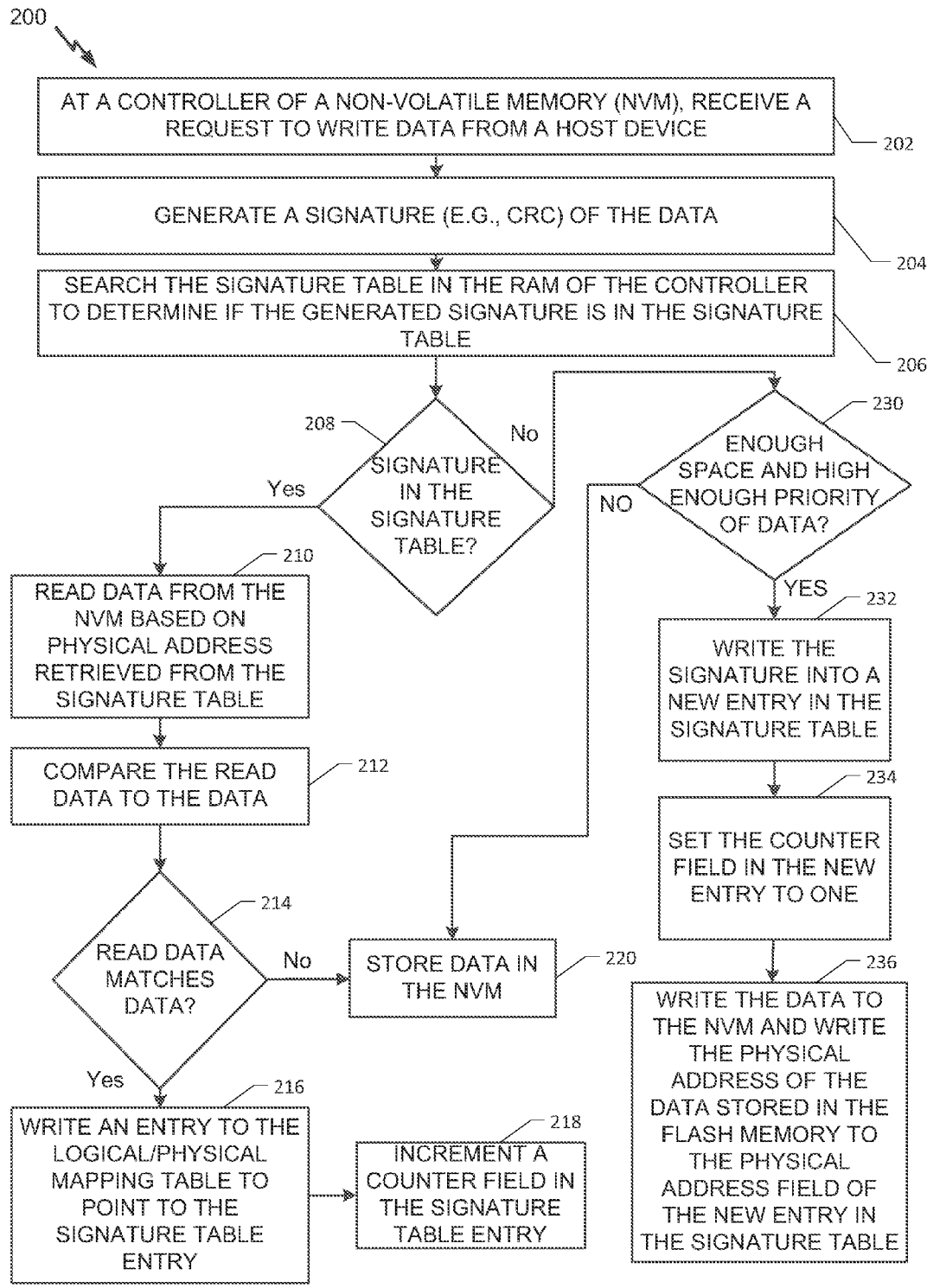
FIG. 2 is a flow chart of a particular illustrative embodiment of a method of processing duplicate data.

Referring to FIG. 2, a particular embodiment of a method 200 of operating at a controller of a non-volatile memory is shown. The method 200 includes receiving a request from a host device to write data, at 202. For example, the user data 132 may be received by the controller 120 along with a write command from the host device 130. The method 200 further includes generating a signature of the data, at 204. For example, the signature may be a CRC value that is generated by the signature generation module 126 within the controller 120 of the data storage device 102. The method 200 further includes searching the signature table to determine if the generated signature is in the signature table, such as by comparing the signature to each of the signatures within the signature table, at 206.

For example, the signature table 140 may be searched to locate the generated signature. If the signature is found in the signature table, at 208, then the method 200 proceeds to read data from the non-volatile memory based on a physical address retrieved from the signature table, at 210. The method 200 further includes comparing the data read from the non-volatile memory to the data received from the host device, at 212. The data comparison may be performed by logic within the memory management engine 124, such as by the data comparison logic 144. The comparison is performed to verify that the signature match is valid (i.e., that the user data 132 exactly matches the data stored within the non-volatile memory 104, the data identified by the matching entry within the signature table 140). If the data read from the non-volatile memory does not match the data received from the host device then the data from the host device is stored within the non-volatile memory, at 220. However, if the read data does match the data from the host device, then the method 200 writes an entry to a logical mapping table to point to the signature table entry, at 216, and increments a count field in the signature table entry, at 218.

Referring to decision 208, if the signature is not found in the signature table, then the method 200 proceeds to determine whether there is enough available space in the signature table to add a new entry, at 230. In addition, a determination may be made as to whether the data has a high enough priority in order to justify creating a new entry within the signature table, at 230. If there is enough space at the signature table and if the data has a high enough priority, then the method 200 stores the generated signature into a new entry of the signature table, at 232, and sets the count field in the new entry to a value of one, at 234. The count within the new entry in the signature table is set to one to indicate that the entry is a new entry within the signature table.

The method 200 further includes writing the data from the host device to the non-volatile memory and writing the physical address of the corresponding memory location of the non-volatile memory to the physical address field of the new entry within the signature table, at 236. For example, a new entry may be added to the signature table 140, and the new entry is updated to include the generated signature of the received data, the physical address of the data stored within the non-volatile memory 104, and a count value of "1". After the user data has been stored to the non-volatile memory and after the signature table has been updated by inserting the new entry, the signature table may be used to process a subsequent data write operation.

Referring to decision 230, if there is not enough space in the signature table or if the data does not have sufficient priority to replace an existing entry, processing advances to 220 where the data is stored to the non-volatile memory. After the user data is stored in the non-volatile memory, an entry may be written to the logical mapping table. The entry in the logical address table is mapped to the physical address that stores the data. A new entry may also be added to the logical mapping table to map a logical address of the data to the new entry in the signature table.

In some implementations, the method 200 may be used with hot logical addresses as described with respect to FIG. 1. For example, a second request to write second data may be received from the host device. A determination may be made that a generated second signature corresponding to the second data matches a second signature in a second signature table entry corresponding to second stored data. The second signature table entry may include a second physical address of the second stored data. For example, the second signature table entry may correspond to entry N-1 in the signature table 140 of FIG. 1.

Second mapping information may be written to the entry in the logical mapping table to point to the second signature table entry. For example, the mapping field for logical address D in the logical mapping table 142 may be updated such that logical address D is mapped to the entry N-1 in the signature table 140. A second count value in a second count field in the second signature table entry may be incremented (e.g., the count field for entry N-1 is increased from 0 to 1), and the count value in the signature table entry may be decremented (e.g., the count field for entry N is decreased from 1 to 0). When the entry in the logical mapping table is identified as a frequently modified entry (e.g., corresponding to the hot logical address D of FIG. 1), the signature table entry may be maintained in the signature table and the stored data may be maintained in the flash memory independent of the count value.

Although various components depicted herein are illustrated as block components and described in general terms, such components may include one or more microprocessors, state machines, or other circuits configured to enable the processing of data using the signature table 140 of FIG. 1. For example, the controller 120 may represent physical components, such as hardware controllers, state machines, logic circuits, or other structures, to enable the controller 120 to generate, update, and use the signature table 140 and the logical mapping table 142 to efficiently identify and manage duplicate data.

The controller 120 may be implemented using a microprocessor or microcontroller programmed to create and manage the signature table 140 and the logical mapping table 142. In a particular embodiment, the controller 120 includes a processor executing instructions that are stored at the non-volatile memory 104, or at the controller memory 122. Alternatively, or in addition, instructions that are executed by the processor may be stored at a separate memory location that is not part of the non-volatile memory 104, such as at a read-only memory (ROM).

In a particular embodiment, the data storage device 102 may be implemented in a portable device configured to be selectively coupled to one or more external devices. However, in other embodiments, the data storage device 102 may be attached to, or embedded within, one or more host devices, such as within a housing of a host communication device. For example, the data storage device 102 may be within a packaged apparatus, such as a wireless telephone, a personal digital assistant (PDA), a gaming device or console, a portable navigation device, or other device that uses internal non-volatile memory. In a particular embodiment, the data storage device 102 may include, or may be coupled to a non-volatile memory, such as a three-dimensional (3D) memory, a flash memory (e.g., NAND, NOR, Multi-Level Cell (MLC), a Divided bit-line NOR (DINOR) memory, an AND memory, a high capacitive coupling ratio (HiCR), asymmetrical contactless transistor (ACT), or other flash memories), an erasable programmable read-only memory (EPROM), an electrically-erasable programmable read-only memory (EEPROM), a read-only memory (ROM), a one-time programmable memory (OTP), or any other type of memory.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments.

The above-disclosed subject matter is to be considered illustrative, and not restrictive, and the appended claims are intended to cover all modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
in a data storage device including a controller and a memory, performing:
receiving a request to write data to a location in the memory corresponding to a logical address;
generating a signature of the data;
searching a signature table in a controller memory of the controller to determine if the generated signature matches a particular signature in the signature table, wherein the particular signature is associated with a physical address of stored data; and
writing information to an entry in a logical mapping table responsive to determining that the generated signature matches the particular signature in the signature table, wherein the information points to a signature table entry, in the signature table, that includes the particular signature,
wherein the logical mapping table includes a logical address field and a mapping field, wherein the mapping field of the entry of the logical mapping table includes the information that points to the signature table entry, and wherein the mapping field of a second entry of the logical mapping table includes second information that points to a second physical address.

2. The method of claim 1, wherein the stored data is stored in the memory, and further comprising:
generating a data structure that identifies at least one frequently modified logical address;
determining that the logical address comprises a frequently modified logical address; and
updating the data structure to identify the logical address as a frequently modified logical address.

3. The method of claim 1, further comprising:
storing the logical mapping table in the controller memory that includes random access memory; and
incrementing a count value in a count field in the signature table entry based on the generated signature.

4. The method of claim 3, wherein the signature table includes a second signature table entry corresponding to second stored data stored in the memory, the second signature table entry comprising a second signature of the second stored data and the second physical address of the second stored data, and further comprising:
receiving a second request to write the second stored data to a location in the memory, the location corresponding to the logical address;
determining that a generated second signature corresponding to the second stored data matches the second signature; and
writing third information to the entry in the logical mapping table to point to the second signature table entry.

5. The method of claim 4, further comprising:
in response to writing the third information to the entry of the logical mapping table:
incrementing a second count value in a second count field in the second signature table entry; and
decrementing the count value in the signature table entry.

6. The method of claim 3, wherein, when the entry in the logical mapping table is associated with the logical address, the signature table entry is maintained in the signature table and the stored data is maintained in the memory independent of the count value.

7. The method of claim 1, further comprising:
in response to determining that the generated signature matches the particular signature:
reading the stored data from the memory based on the physical address retrieved from the signature table entry; and
comparing the read data to the data corresponding to the request; and
in response to the read data not matching the data:
writing the data to a particular location in the memory; and
writing to the entry in the logical mapping table to indicate the particular location in the memory.

8. The method of claim 1, wherein, when the signature table entry has a count value of zero, no entries of the logical mapping table are linked to the signature table entry.

9. The method of claim 1, further comprising, in response to determining that the generated signature is not in the signature table, determining whether to update the signature table to include a new entry, wherein determining whether to update the signature table to include the new entry is based on at least one of available space in the signature table and a priority of the data.

10. The method of claim 1, further comprising:
in response to determining that the generated signature is not in the signature table, determining whether to update the signature table to include a new entry; and
in response to determining to update the signature table to include the new entry:
writing the generated signature into the new entry in the signature table;
setting a count field of the new entry to one;
writing the data to a particular location in the memory; and
writing the physical address of the particular location to a physical address field of the new entry.

11. The method of claim 1, further comprising:
in response to determining that the generated signature is not in the signature table, determining whether to update the signature table to include a new entry; and
in response to determining to not update the signature table to include the new entry:
writing the data to a particular location in the memory; and
writing the entry to the logical mapping table to indicate the particular location in the memory.

12. A data storage device comprising:
a controller including a signature table and a logical mapping table; and
a non-volatile memory coupled to the controller,
wherein the signature table includes a signature table entry that contains a signature field and a physical address field, wherein the signature field is configured to store a signature that corresponds to a data element stored in the non-volatile memory, and wherein the physical address field is configured to store a physical address of the data element, and
wherein the controller is configured to:
receive a request to write data to the non-volatile memory, the request including a logical address;
generate a signature of the data;
determine that the generated signature matches a particular signature in the signature field of the signature table entry;
read the stored data element from the memory based on the physical address retrieved from the signature table entry; and
responsive to the read data element matching the data, write mapping information to an entry in the logical mapping table corresponding to the logical address, wherein the mapping information points to the signature table entry,
wherein the logical mapping table includes a logical address field and a mapping field, wherein the mapping field of the entry of the logical mapping table includes the mapping information that points to the signature table entry, and wherein the mapping field of a second entry of the logical mapping table includes second mapping information that points to a second physical address.

13. The data storage device of claim 12, wherein the signature table entry further includes a count field, and wherein a count value of the count field corresponds to a number of logical addresses of the logical mapping table that are linked to the signature table entry.

14. The data storage device of claim 12, wherein the signature table is stored in a controller memory, and wherein the controller memory comprises a random access memory (RAM).

15. The data storage device of claim 12, wherein the controller further includes a memory management engine, a signature searching engine, and a signature generator, and wherein the logical address is identified as a frequently modified address in response to a first data value corresponding to the logical address being repeatedly written to the memory during a period of time.

16. The data storage device of claim 15, wherein the first data value is a logical one value, the logical one value corresponding to the signature table entry, and wherein a second data value is a logical zero value, the logical zero value corresponding to a second signature table entry included in the signature table.

17. The data storage device of claim 12, wherein the mapping field is linkable to the signature table entry.

18. The data storage device of claim 12, wherein the controller is configured to maintain signature table entries corresponding to data elements that have been mapped to the logical address in response to the logical address being identified as a frequently modified address.

19. The data storage device of claim 12, wherein the signature table includes a first set of multiple entries and the logical mapping table includes a second set of multiple entries.

20. The data storage device of claim 12, wherein more than one entry in the logical mapping table is mapped to a single entry in the signature table, and wherein the data is received from a host processor.

21. The data storage device of claim 12, wherein the controller is configured, during a write operation, to read the signature prior to storing second data to the non-volatile memory, wherein the non-volatile memory comprises a flash memory, and wherein the controller includes a data structure of frequently modified logical addresses.

22. The data storage device of claim 12, wherein the data structure of frequently modified logical addresses comprises a list of one or more frequently written to logical addresses.

23. An apparatus comprising:
means for storing a signature table, wherein the signature table includes a signature table entry that contains a signature field and a physical address field, wherein the signature field is configured to store a signature that corresponds to a data element stored in a non-volatile memory, and wherein the physical address field is configured to store a physical address of the data element;
means for receiving a request to write data to the non-volatile memory, the request including a logical address;
means for determining that a generated signature of the data matches a particular signature in the signature field of the signature table entry;
means for reading the stored data from the memory based on the physical address retrieved from the signature table entry; and
means for writing mapping information to an entry in a logical mapping table corresponding to the logical address responsive to the read data matching the data, wherein the mapping information points to the signature table entry,
wherein the logical mapping table includes a logical address field and a mapping field, wherein the mapping field of a first entry of the logical mapping table includes the mapping information that points to the signature table entry, and wherein the mapping field of a second entry of the logical mapping table includes mapping information that points to a second physical address.

24. The apparatus of claim 23, further comprising means for determining that the read data matches the data.

* * * * *